(12) United States Patent
Minakawa

(10) Patent No.: US 12,309,855 B2
(45) Date of Patent: May 20, 2025

(54) COMMUNICATION APPARATUS, COMMUNICATION METHOD, AND NON-TRANSITORY COMPUTER-READABLE STORAGE MEDIUM

(71) Applicant: CANON KABUSHIKI KAISHA, Tokyo (JP)

(72) Inventor: Atsushi Minakawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 17/986,090

(22) Filed: Nov. 14, 2022

(65) Prior Publication Data

US 2023/0070058 A1 Mar. 9, 2023

Related U.S. Application Data

(63) Continuation of application No. 17/172,164, filed on Feb. 10, 2021, now Pat. No. 11,647,549, which is a (Continued)

(30) Foreign Application Priority Data

Sep. 6, 2018 (JP) ................................ 2018-167211

(51) Int. Cl.
*H04W 76/10* (2018.01)
*H04W 12/06* (2021.01)
(Continued)

(52) U.S. Cl.
CPC ........... *H04W 76/10* (2018.02); *H04W 12/06* (2013.01); *H04W 12/08* (2013.01); *H04W 84/12* (2013.01)

(58) Field of Classification Search
CPC ..... H04W 76/10; H04W 12/06; H04W 12/08; H04W 84/12; H04M 1/00; H04L 63/20
See application file for complete search history.

(56) References Cited

U.S. PATENT DOCUMENTS 9,807,584 B2 10/2017 Minakawa
10,609,581 B2 3/2020 Lee
(Continued)

FOREIGN PATENT DOCUMENTS

JP 2018-521566 A 8/2018
WO 2016/195821 A 12/2016
WO 2017/085978 A1 5/2017

OTHER PUBLICATIONS

Notice of Reasons for Refusal issued by the Japan Patent Office on Dec. 2, 2022 in corresponding JP Patent Application No. 2018-167211, with English translation.
(Continued)

*Primary Examiner* — Khawar Iqbal
(74) *Attorney, Agent, or Firm* — Carter, DeLuca & Farrell LLP

(57) ABSTRACT

A communication apparatus receives a signal that requests for communication parameter(s) from a first other communication apparatus that connects to a wireless network by using the communication parameter(s), determines whether or not the communication parameter(s) have been provided to a second other communication apparatus that constructs the wireless network, upon receiving the signal, and notifies the first other communication apparatus of the fact that the communication parameter(s) have not been provided to the second other communication apparatus in a case where it is determined that the communication parameter(s) have not been provided to the second other communication apparatus.

6 Claims, 8 Drawing Sheets

Related U.S. Application Data continuation of application No. PCT/JP2019/027955, filed on Jul. 16, 2019.

(51) Int. Cl.
*H04W 12/08* (2021.01)
*H04W 84/12* (2009.01)

(56) References Cited

U.S. PATENT DOCUMENTS

| | | |
|---|---|---|
| 10,873,842 B2 | 12/2020 | Mccann |
| 10,932,311 B2 | 2/2021 | Hunt |
| 11,075,796 B2 | 7/2021 | Lee |
| 11,347,448 B2 | 5/2022 | Shibata |
| 11,683,162 B2 * | 6/2023 | Nix ................ H04L 9/3263 713/171 |
| 2017/0295448 A1 * | 10/2017 | McCann ............ H04W 12/04 |
| 2018/0054845 A1 | 2/2018 | Lee et al. |
| 2018/0316562 A1 * | 11/2018 | Lepp ............... H04W 12/50 |
| 2018/0324876 A1 | 11/2018 | Iwami |
| 2019/0215878 A1 | 7/2019 | Goto |
| 2019/0238435 A1 * | 8/2019 | Tao ................. H04W 48/14 |
| 2019/0303048 A1 * | 10/2019 | Suzuki ............. G06F 3/1238 |
| 2019/0306710 A1 | 10/2019 | Cammarota |
| 2019/0380034 A1 | 12/2019 | Montemurro |
| 2020/0037159 A1 * | 1/2020 | Jones ............... H04B 11/00 |
| 2020/0154276 A1 | 5/2020 | Minakawa |
| 2020/0195504 A1 * | 6/2020 | Tao ................. H04L 69/14 |
| 2020/0396584 A1 * | 12/2020 | Jo .................. H04L 9/40 |
| 2021/0084469 A1 | 3/2021 | Mccann |
| 2022/0015161 A1 | 1/2022 | Goto |
| 2022/0083293 A1 * | 3/2022 | Tsuji ............... H04W 12/0431 |
| 2022/0113920 A1 * | 4/2022 | Shibata ............. H04W 76/14 |
| 2022/0183106 A1 * | 6/2022 | Miyake ............. H04W 12/0431 |
| 2022/0283756 A1 * | 9/2022 | Shibata ............. G06F 3/1292 |
| 2023/0017063 A1 * | 1/2023 | Suzuki ............. G06F 3/122 |
| 2024/0244433 A1 * | 7/2024 | Montemurro ........ H04W 12/35 |

OTHER PUBLICATIONS

International Search Report issued in International Application No. PCT/JP2019/027955 dated Oct. 8, 2019, pp. 1-9, with English Translation.

Notice of Reasons for Refusal issued by the Japanese Patent Office on Sep. 6, 2024 in corresponding JP Patent Application No. 2023-096465, with English translation.

\* cited by examiner

COMMUNICATION APPARATUS, COMMUNICATION METHOD, AND NON-TRANSITORY COMPUTER-READABLE STORAGE MEDIUM

CROSS-REFERENCE TO RELATED APPLICATIONS

This application is a Continuation of U.S. patent application Ser. No. 17/172,164 filed on Feb. 10, 2021, which is a Continuation of International Patent Application No. PCT/JP2019/027955, filed Jul. 16, 2019, which claims the benefit of Japanese Patent Application No. 2018-167211, filed Sep. 6, 2018, both of which are hereby incorporated by reference herein in their entirety.

BACKGROUND OF THE INVENTION

Field of the Invention

The present invention relates to a communication technology.

Background Art

In recent years, it has become increasingly common that electronic devices such as digital cameras, printers, mobile phones and smartphones are equipped with a wireless communication function, and these devices are used in the state of being connected to a wireless network. In order to connect an electronic device to a wireless network, it is necessary to set various communication parameters such as an encryption method, an encryption key, an authentication method, and an authentication key. Examples of techniques for facilitating the setting of such communication parameters include a communication parameter setting protocol that employs a QR code (registered trademark) or the like (Wi-Fi Device Provisioning Protocol, hereinafter referred to as DPP) (PTL1). According to DPP, there is a device called a configurator that provides communication parameter(s), and a device called an enrollee that requests and acquires communication parameter(s). An enrollee operates as either an access point that constructs a wireless network by using the acquired communication parameter(s), or a station (a connecting terminal) that connects to the wireless network.

CITATION LIST

Patent Literature

PTL1: US-2017-295448

According to DPP, when requesting communication parameter(s) from a configurator, an enrollee notifies the configurator of whether the enrollee wishes to operate as an access point or a station. An enrollee that wishes to play the role of an access point constructs a wireless network based on the communication parameter(s) acquired from the configurator. On the other hand, an enrollee that wishes to play the role of a station connects to the wireless network constructed by an access point (an enrollee that serves as an access point), using the communication parameter(s) acquired from the configurator. The following describes a case in which, although a configurator has not provided communication parameter(s) to an enrollee that wishes to play the role of an access point, the configurator provides communication parameter(s) to an enrollee that wishes to play the role of a station. In such a case, the station tries to connect to the wireless network using the acquired communication parameter(s), but the wireless network has not constructed by the access point, and therefore the station cannot connect to the wireless network.

In view of the above-described problem, the present disclosure provides a technique for preventing unnecessary connection processing from being performed.

SUMMARY OF THE INVENTION

According to one aspect of the present invention, there is provided a communication apparatus, which comprises: a reception unit configured to receive a signal that requests for communication parameter(s) from a first other communication apparatus that connects to a wireless network by using the communication parameter(s); a first determination unit configured to determine whether or not the communication parameter(s) have been provided to a second other communication apparatus that constructs the wireless network, upon the reception unit receiving the signal; and a notification unit configured to notify the first other communication apparatus of the fact that the communication parameter(s) have not been provided to the second other communication apparatus in a case where the first determination unit determines that the communication parameter(s) have not been provided to the second other communication apparatus.

According to another aspect of the present invention, there is provided a communication apparatus, which comprises: a reception unit configured to receive a signal that requests for communication parameter(s) from a first other communication apparatus that connects to a wireless network by using the communication parameter(s); a first determination unit configured to determine whether or not the communication parameter(s) have been provided to a second other communication apparatus that constructs the wireless network, upon the reception unit receiving the signal; and a providing unit configured not to provide the communication parameter(s) to the first other communication apparatus in a case where the first determination unit determines that the communication parameter(s) have not been provided to the second other communication apparatus, and to provide the communication parameter(s) to the first other communication apparatus in a case where the first determination unit determines that the communication parameter(s) have been provided to the second other communication apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

The following describes embodiments of the present invention with reference to the accompanying drawings. However, note that the technical scope of the present invention is determined by the scope of claims, and is not limited to the following individual embodiments.

First Embodiment

System Configuration

Figure 1:
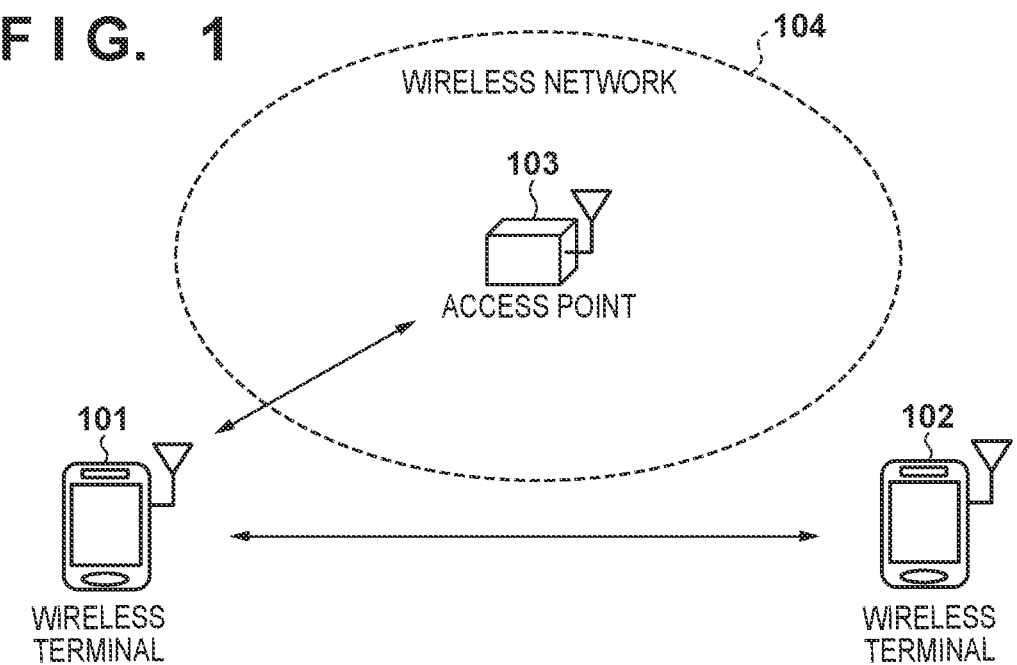
FIG. 1 is a diagram showing an example of a configuration of a communication system according to an embodiment.

FIG. 1 shows an example of a configuration of a communication system according to a first embodiment. The present communication system includes wireless terminals 101 and 102 and an access point 103. The wireless terminal 101 has a wireless LAN (Local Area Network) communication function, and operates as the configurator defined in DPP, for example. Therefore, the wireless terminal 101 can provide the access point 103 with communication parameter(s) that are used to form a wireless network 104, and provide the wireless terminal 102 with communication parameter(s) that are used to connect to the wireless network 104. Here, the communication parameter(s) include setting items that are necessary for wireless communication, such as an SSID (Service Set Identifier), which is a network identifier, an encryption method, an encryption key, and an authentication method. Note that the wireless terminal 101 that operates as a configurator also provides role information when providing communication parameter(s). Role information indicates the role served after the communication parameter(s) have been acquired. This role is either an access point that constructs a wireless network using the acquired communication parameter(s), or a station (a connecting terminal) that connects to the wireless network using the acquired communication parameter(s).

The access point 103 operates as the access point defined in DPP, for example. The access point 103 also operates as the enrollee defined in DPP, and can acquire communication parameter(s) from the wireless terminal 101 that operate as a configurator, and form the wireless network 104. The wireless terminal 102 has a wireless LAN communication function, and operates as the enrollee defined in DPP, for example. Therefore, the wireless terminal 102 can acquire communication parameter(s) from the wireless terminal 101 that operates as a configurator, and connect to the wireless network 104 formed by the access point 103. Note that when requesting communication parameter(s) from the wireless terminal 101 that operates as a configurator, the wireless terminal 102 that operates as an enrollee and the access point 103 also provide the above-described role information to the wireless terminal 101.

Examples of the wireless terminals 101 and 102 according to the present embodiment include, but are not limited to, electronic devices such as a mobile phone, a digital camera, a video camera, a PC, a PDA, a smartphone, and a smart watch. Also, although the wireless terminals 101 and 102 are used as electronic devices connected to a wireless network in the present embodiment, electronic devices are not limited to them, and any electronic devices that can connect to a wireless network may be used, and they need not be portable devices. Also, the access point 103 in the present embodiment may be an electronic device that operates as the access point defined in DPP and has a specific function (a printer, a digital camera, or the like).

Configurations of Wireless Terminals

Figure 2:
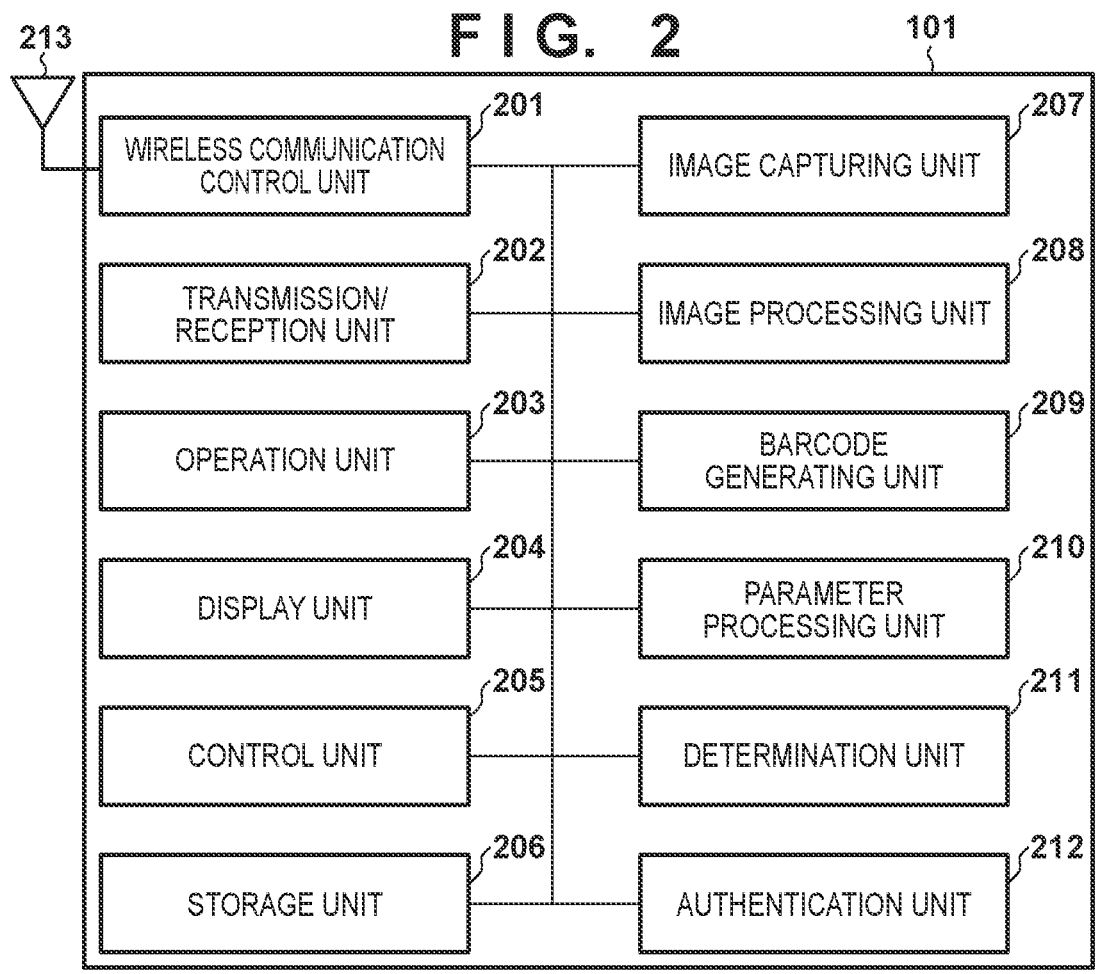
FIG. 2 is a block diagram showing an example of a configuration of a wireless terminal according to an embodiment.

FIG. 2 is a block diagram showing an example of a functional configuration of the wireless terminal 101 according to the present embodiment. Note that the functional configuration of the wireless terminal 102 is the same as that of the wireless terminal 101. The functional units shown in FIG. 2 are realized by at least one CPU (not shown) executing a program stored in a storage unit 206. That is to say, the flowcharts described below can be realized by at least one CPU executing a program stored in the storage unit 206 to perform information computation and processing, and control pieces of hardware. However, some or all of the functional units shown in FIG. 2 may be realized using dedicated hardware.

In FIG. 2, a wireless communication control unit 201 controls an antenna 213 and a wireless circuit (not shown) to transmit and receive a wireless signal to and from another device. A transmission/reception unit 202 performs data transmission/reception control according to protocols respectively corresponding to communication layers, via the wireless communication control unit 201. An operation unit 203 is used by a user to operate the wireless terminal 101. The operation unit 203 may include, for example, a button for activating an image capturing unit 207. Note that the operation unit 203 may be constituted by hardware, or a UI (User Interface) provided by software using a display unit 204. The display unit 204 is constituted by an LCD (Liquid Crystal Display), an LED (Light Emitting Diode), or the like, and performs various kind of display processing.

A control unit 205 controls the entire wireless terminal 101. The storage unit 206 includes a ROM that stores a control program for controlling the wireless terminal 101 and data, and a RAM that controls temporary memory. The image capturing unit 207 includes an imaging device, a lens, and so on, and captures a still image and a moving image. An image processing unit 208 performs image processing on, for example, an image captured by the image capturing unit 207. The image processing unit 208 also analyzes the image of a QR code captured by the image capturing unit 207, decodes encoded information, and acquires the information (QR code information). A code generation unit 209 generates QR code information, and performs control to display the generated QR code information as a QR code (image) on the display unit 204. Although a QR code is used as the image of code information in the present embodiment, the image of code information is not limited to a QR code, and a barcode, a two-dimensional code, or the like may be used.

A parameter processing unit 210 performs processing to provide and acquire communication parameter(s) that are used to connect to the wireless network 104. A determination unit 211 performs various kinds of determination processing related to communication parameter providing processing. For example, the determination unit 211 determines the role of a device that constructs or connects to a wireless network using communication parameter(s). In the present embodiment, the roles to be determined include an "access point" that constructs a wireless network, and a "station" that connects to a wireless network. An authentication unit 212 performs control to authenticate other devices.

The above-described functional blocks are examples, and a plurality of functional blocks may form one functional block, or any of the functional blocks may be further divided into blocks that perform a plurality of functions.

Processing Performed to Provide Communication Parameters in DPP Standards

Figure 3:
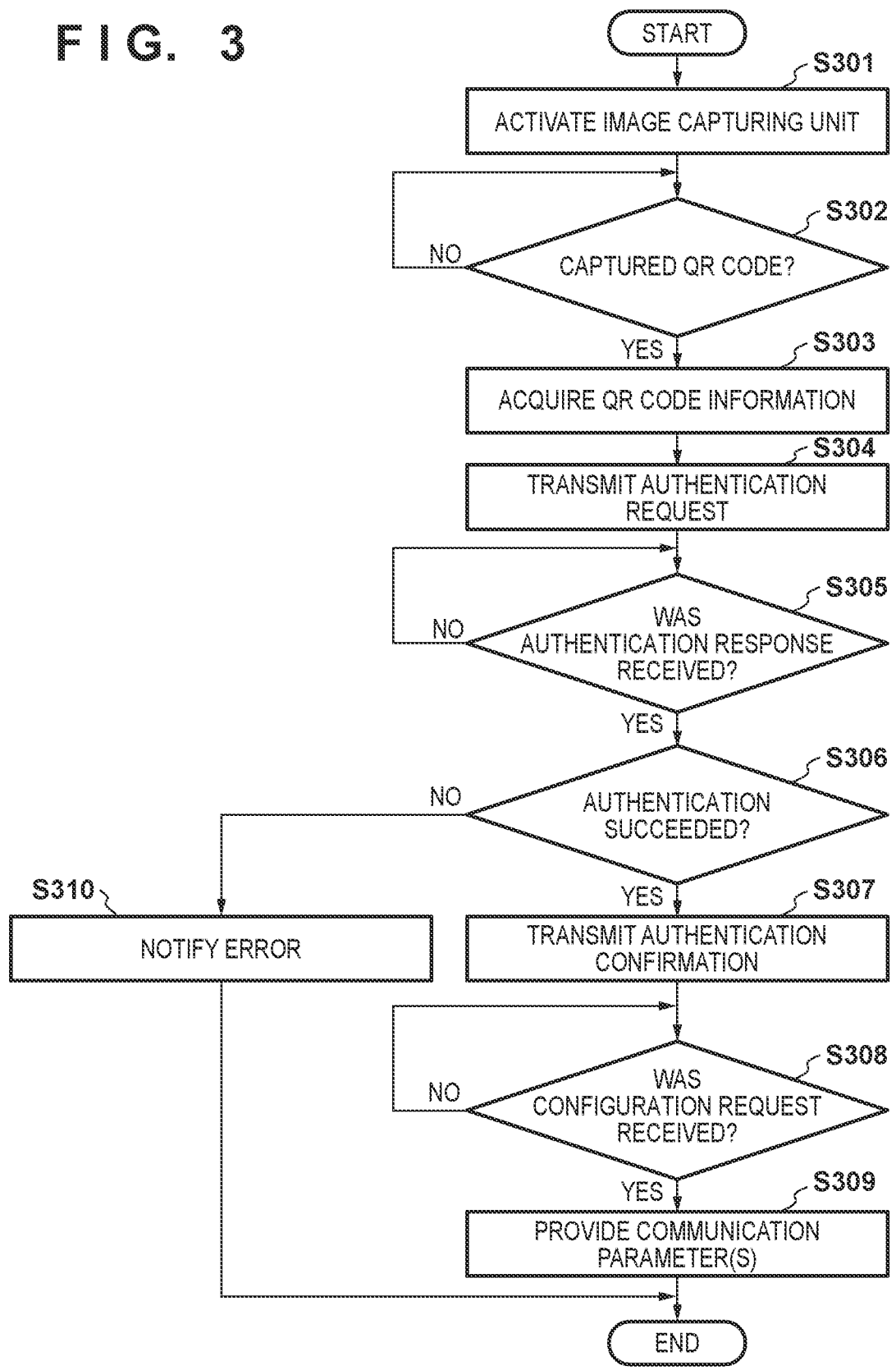
FIG. 3 is a flowchart showing communication parameter providing processing that is performed by a wireless terminal.
Figure 4:
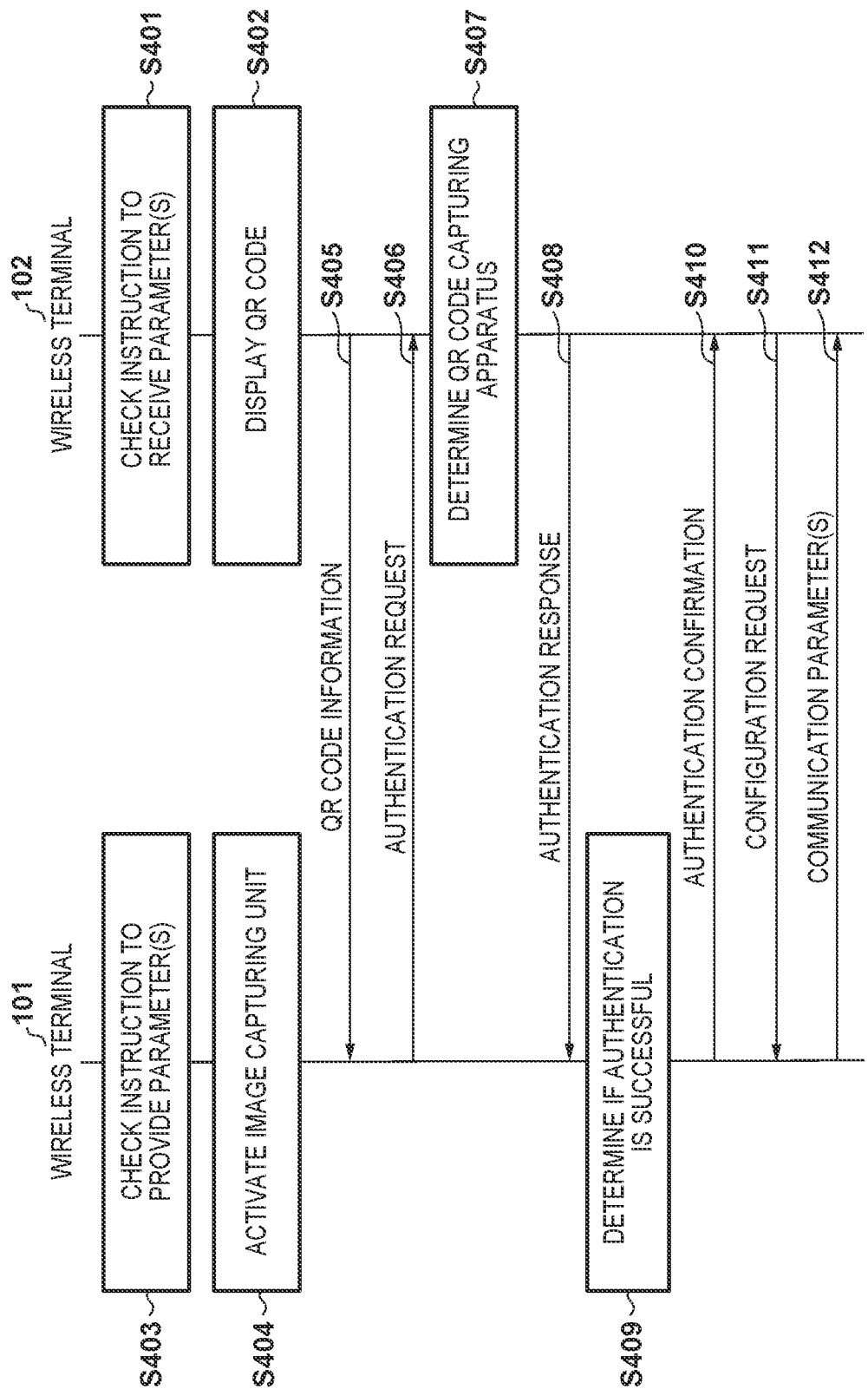
FIG. 4 is a sequence diagram showing communication parameter providing processing that is performed between a wireless terminal 101 and a wireless terminal 102.

Next, processing that is performed to provide communication parameter(s) defined in the DPP standards will be described with reference to FIGS. 3 and 4. First, processing that is performed by the wireless terminal 101 that operates as a configurator to provide communication parameter(s) in order to connect the wireless terminal 102 to the wireless network 104 will be described. FIG. 3 is a flowchart showing processing through which the wireless terminal 101 that operates as a configurator provides communication parameter(s) to the wireless terminal 102 that operates as an enrollee.

In the wireless terminal 101, upon the operation unit 203 receiving an instruction from a user to provide parameter(s), the control unit 205 activates the image capturing unit 207 to capture (an image including) a QR code displayed by the wireless terminal 102 (S301). The QR code includes a public key that is to be used to authenticate the wireless terminal 102. The control unit 205 determines whether or not the image capturing unit 207 has captured an image of the QR code (S302). Here, the QR code displayed by the wireless terminal 102 is not limited to being displayed on the display unit 204 or the like of a wireless terminal, and may be printed on a label or the like attached to the housing or an attachment of the wireless terminal 102. Alternatively, the QR code may be shown on, for example, a manual or the like for the wireless terminal 102. Note that, in S302, if the image capturing unit 207 fails to capture the QR code within a predetermined period from the activation of the image capturing unit 207, the wireless terminal 101 may terminate communication parameter providing processing.

If it is determined that the QR code has been captured (YES in S302), the image processing unit 208 acquires QR code information that includes a public key that is to be used to authenticate the wireless terminal 102 from the captured QR code (S303). Next, the authentication unit transmits an authentication request to the wireless terminal 102 via the transmission/reception unit 202 (S304). This authentication request is a DPP Authentication Request frame defined in the DPP standards, for example. Such an authentication request includes authentication information to be used for authentication, identification information of the wireless terminal 101, a random number, and a public key that is to be used to generate a shared key. Authentication information may be the hash value of the public key that is included in the QR code and is to be used to authenticate the wireless terminal 102. Identification information of the wireless terminal 101 may be the hash value of the public key to be used to authenticate the wireless terminal 101. The random number may be used for authentication when an authentication response described below is received. The public key to be used to generate a shared key may be a key that is the source of the shared key generated with the wireless terminal 102.

Upon receiving an authentication request, the wireless terminal 102 determines whether or not the apparatus that has transmitted the authentication request is the apparatus that has captured the image of the QR code. This determination is performed using the authentication information included in the authentication request. That is to say, the wireless terminal 102 calculates the hash value of the public key included in the displayed QR code, compares the calculated hash value with the hash value (authentication information) included in the authentication request, and determines that the authentication is successful when they match each other. Note that the hash function used to calculate the hash value at this time been determined in advance under an agreement with the wireless terminal 101 that transmits the authentication request.

After transmitting an authentication request to the wireless terminal 102 in S304, the transmission/reception unit 202 of the wireless terminal 101 waits to receive an authentication response from the wireless terminal 102 (S305). If the transmission/reception unit 202 fails to receive a predetermined authentication response in S305, communication parameter providing processing may be terminated. The authentication response is a DPP Authentication Response frame defined in the DPP standards, for example. This authentication response includes a public key that is to be used to generate a shared key for of the wireless terminal 102, a random number, and tag information.

In FIG. 3, upon receiving the authentication response (YES in S305), the authentication unit 212 of the wireless terminal 101 verifies the content of the authentication response (S306). First, the authentication unit 212 of the wireless terminal 101 generates a shared key by using both the public key for generating a shared key of the wireless terminal 102 included in the authentication response, and the private key for generating a shared key of the wireless terminal 101 itself. Note that this is a shared key generation method for the wireless terminal 101 that operates as a configurator, and the wireless terminal 102 that operates as an enrollee generates a shared key by using both the public key for generating a shared key of the wireless terminal 101 and the private key for generating a shared key of the wireless terminal 102. The shared key is generated according to the ECDH (Elliptic Curve Diffie-Hellman) method, for example. Hereinafter, a shared key is generated based on this ECDH method. However, the generation method is not limited to this method, and a shared key may be generated according to another public key encryption method.

Next, the authentication unit 212 determines whether or not the authentication is successful, using tag information included in the authentication response. This tag information is generated by encrypting the random number included in the authentication request transmitted by the wireless terminal 101, using both the private key for generating a shared key of the wireless terminal 102 and the public key for generating a shared key of the wireless terminal 101. The authentication unit 212 determines that the authentication is successful when the tag information can be properly decrypted using the shared key generated by the authentication unit 212. The authentication unit 212 determines that the authentication is successful when the tag information can be decrypted using the shared key generated by authentication unit 212, and determines that the authentication is unsuccessful when the tag information cannot be decrypted.

If it is determined that the authentication is unsuccessful (NO in S306), the control unit 205 displays an error message on the display unit 204 (S310), and terminates parameter providing processing. If it is determined that the authentication is successful (YES in S306), the authentication unit 212 transmits an authentication confirmation to the wireless terminal 102 via the transmission/reception unit 202 (S307). This authentication confirmation is a DPP Authentication Confirm frame defined in the DPP standards, for example. This authentication confirmation includes tag information. This tag information is generated by encrypting the random number included in the authentication response transmitted by the wireless terminal 102, using the generated shared key. After transmitting the authentication confirmation, the transmission/reception unit 202 of the wireless terminal 101 waits until the wireless terminal 102 that serves as an enrollee transmits a configuration request thereto (S308).

On the other hand, the wireless terminal 102 determines that the authentication is successful if the wireless terminal 102 receives the authentication confirmation from the wireless terminal 101 and the tag information included in the authentication confirmation can be properly decrypted by using the shared key generated by the wireless terminal 102. If it is determined that the authentication is successful, the wireless terminal 102 determines that the wireless terminal 101 that has transmitted the authentication request as a configurator, and transmits a configuration request to the wireless terminal 101. This configuration request is a DPP Configuration Request frame defined in the DPP standards, for example. This configuration request includes device information and role information regarding the wireless terminal 102. Device information is, for example, the device name of the wireless terminal 102. Role information is information indicating the role served after the reception of the communication parameter(s), which is an "access point" or a "station" in the present embodiment. Information included in a configuration request is encrypted using the shared key used by the wireless terminal 102 at the time of the generation of the tag information included in the authentication response.

Upon receiving the configuration request from the wireless terminal 102 (YES in S308), the parameter processing unit 210 performs processing to provide communication parameter(s), via the transmission/reception unit 202 (S309). Specifically, the parameter processing unit 210 transmits a configuration response that includes communication parameter(s) that are to be used to construct (form) the wireless network 104, to the wireless terminal 102, via the transmission/reception unit 202. This configuration response is a DPP Configuration Response frame defined in the DPP standards, for example. A configuration response includes communication parameter(s), the expiration date of the parameter(s), a public key of the wireless terminal 101, role information, which is exclusively for a configurator, and so on. The communication parameter(s) included in the configuration response are encrypted using the private key of the wireless terminal 101, which is exclusively for a configurator. Also, the information included in the configuration response is encrypted using the shared key used at the time of the generation of tag information in S307. Note that the communication parameter(s) include, as an encryption key, the public key of the communication partner used at the time of the generation of the shared key (in this case, the public key included in the authentication response from the wireless terminal 102).

After transmitting the configuration request, the wireless terminal 102 that operates as an enrollee waits until a configuration response is transmitted from the wireless terminal 101 that operates as a configurator. Upon receiving the configuration response, the wireless terminal 102 decrypts the information included in the configuration response, using the shared key used at the time of the generation of the tag information. Furthermore, the wireless terminal 102 decrypts the communication parameter(s) encrypted using the private key of the wireless terminal 101, which is exclusively for a configurator, by using the public key of the wireless terminal 101, which is exclusively for a configurator. The wireless terminal 102 can connect to the wireless network 104 using the communication parameter(s) obtained through decryption.

The following further describes the operations of the wireless terminal 101 and the wireless terminal 102 performed until the wireless terminal 101 that performs the above-described processing provides communication parameter(s) to the wireless terminal 102. FIG. 4 is a sequence diagram showing communication parameter providing processing that is performed between the wireless terminal 101 and the wireless terminal 102.

Upon receiving an instruction from the user to receive parameter(s) (S401), the wireless terminal 102 displays a QR code on the display unit 204 of the wireless terminal 102 (S402), and waits for an authentication request. If the terminal device 102 fails to receive an authentication request within a predetermined period, the wireless terminal 102 may stop waiting for an authentication request. Also, if the wireless terminal 102 does not include a means for displaying a QR code (e.g., the display unit 204), and a QR code is printed on a label or the like attached to the housing or an attachment of the wireless terminal 102, S402 is to be skipped. That is to say, upon receiving an instruction to receive parameter(s) (S401), the wireless terminal 102 waits for an authentication request without performing the processing in S402.

On the other hand, upon receiving an instruction from the user to provide parameter(s) (S403), the wireless terminal 101 activates the image capturing unit 207 to capture the image of the QR code displayed by the wireless terminal 102 (S404). Thereafter, the image capturing unit 207 of the wireless terminal 101 captures an image of the QR code displayed by the wireless terminal 102, to acquire QR code information (S405). Upon receiving the QR code information, the wireless terminal 101 generates and transmits an authentication request, and the wireless terminal 102 receives this authentication request (S406). The wireless terminal 102 verifies the content of the received authentication request (S407). Upon determining that the wireless terminal 101 that has transmitted the authentication request is the apparatus that has captured the image of the QR code, the wireless terminal 102 generates and transmits an authentication response (S408). Upon transmitting the authentication response to the wireless terminal 101, the wireless terminal 102 waits until an authentication confirmation is transmitted from the wireless terminal 101.

Upon receiving the authentication response, the wireless terminal 101 verifies the content of the authentication response (S409). Upon determining that the authentication is successful, the wireless terminal 101 transmits an authentication confirmation to the wireless terminal 102 (S410). Upon receiving the authentication confirmation from the wireless terminal 101 (S410), the wireless terminal 102 verifies the content of the authentication confirmation. The wireless terminal 102 determines that the authentication is successful upon properly decrypting the tag information using the shared key generated by the wireless terminal 102. Upon determining that the authentication is successful, the wireless terminal 102 transmits a configuration request to perform communication parameter configuration setting (S411), and waits until a configuration response is transmitted from the wireless terminal 101. Upon receiving the configuration request, the wireless terminal 101 transmits a configuration response in which communication parameter(s) encrypted using the private key of the wireless terminal 101, which is exclusively for a configurator, and the public key exclusively for a configurator, are included (S412). Upon receiving the configuration response, the wireless terminal 102 decrypts the communication parameter(s) using the public key of the wireless terminal 101, which is exclusively for a configurator. The wireless terminal 102 connects to the wireless network 104, using the decrypted communication parameter(s).

As described above, the wireless terminal 101 can provide communication parameter(s) to the wireless terminal 102 through the processing described with reference to FIGS. 3 and 4. Also, the wireless terminal 101 that serves as a configurator can provide communication parameter(s) to the access point 103 that serves as an enrollee through processing that is similar to the processing described with reference to FIGS. 3 and 4. The access point 103 can construct the wireless network 104 by using the acquired communication parameter(s).

Flow of Processing in Present Embodiment

The following describes a case in which the wireless terminal 101 provides communication parameter(s) to the wireless terminal 102 in a state where the wireless terminal 101 has not provided communication parameter(s) to the access point 103. In such a case, the access point 103 has not acquire communication parameter(s), and therefore cannot construct the wireless network 104. As a result, the wireless terminal 102 cannot connect the wireless network 104 even though the wireless terminal 102 has acquired communication parameter(s) and has performed processing to connect to the wireless network 104. Therefore, in order to avoid performing processing to connect to the wireless network 104 that does not exist, it is necessary for the wireless terminal 102 to recognize that the access point 103 has not acquired communication parameter(s). The following describes processing that is performed by the wireless terminal 101 to notify the wireless terminal 102 of the fact that communication parameter(s) have not been provided to the access point 103.

Figure 5:
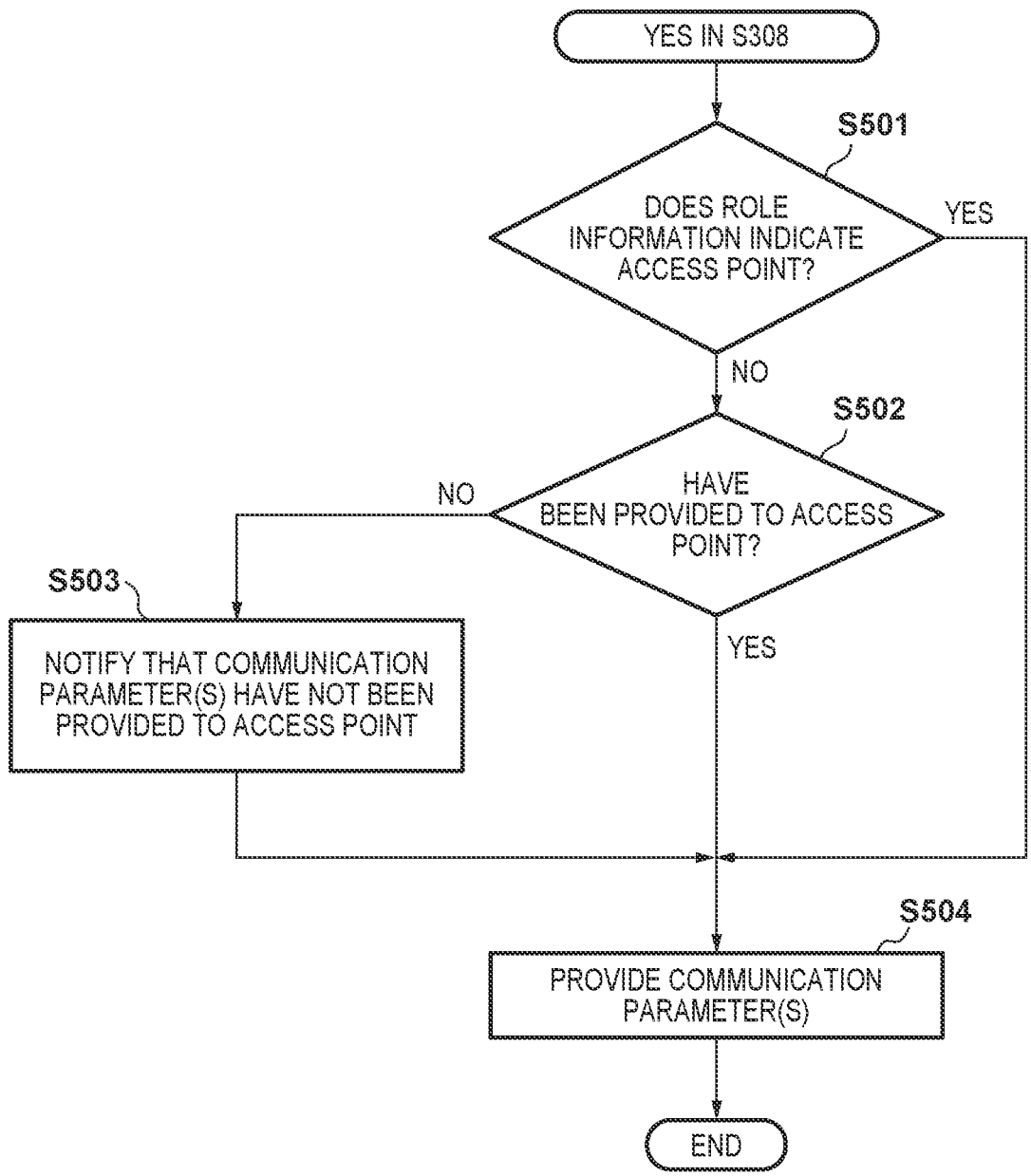
FIG. 5 is a flowchart showing examples of operations performed by a wireless terminal 101 according to a first embodiment.

FIG. 5 is a flowchart showing processing that is performed by the wireless terminal 101 to notify the wireless terminal 102 of the fact that communication parameter(s) have not been provided to the access point 103. Processing that is performed from when the image capturing unit 207 is activated to when the configuration request is received is the same as the processing in FIG. 3 (S301 to S308). FIG. 5 shows processing that is performed after the transmission/reception unit 202 receives a configuration request (YES in S308) in FIG. 3.

The determination unit 211 of the wireless terminal 101 determines whether or not the role of the wireless terminal 102 is an access point, based on the configuration request received from the wireless terminal 102 (S501). Specifically, the determination unit 211 determines whether or not the role information included in the configuration information indicates an access point (S501). If it is determined that the role of the wireless terminal 102 is an access point (the role information indicates an access point) (YES in S501), the parameter processing unit 210 provides (transmits) communication parameter(s) to the wireless terminal 102 via the transmission/reception unit 202 as a configuration response (S504). On the other hand, if it is determined that the role is not an access point, i.e., if the role is determined as a station (the role information indicates a station) (NO in S501), the determination unit 211 further determines whether or not communication parameter(s) have been provided to the access point 103 (S502).

If it is determined that communication parameter(s) have been provided to the access point 103 (YES in S502), the parameter processing unit 210 provides communication parameter(s) to the wireless terminal 102 via the transmission/reception unit 202 as a configuration response (S504). On the other hand, if it is determined that communication parameter(s) have not been provided (NO in S502), the parameter processing unit 210 notifies the wireless terminal 102 of the fact that communication parameter(s) have not been provided to the access point 103, via the transmission/reception unit 202 (S503). Next, the parameter processing unit 210 provides communication parameter(s) to the wireless terminal 102 via the transmission/reception unit 202 as a configuration response (S504). Note that communication parameter(s) may be provided when providing a notification indicating that communication parameter(s) have not been provided in S503.

Figure 6:
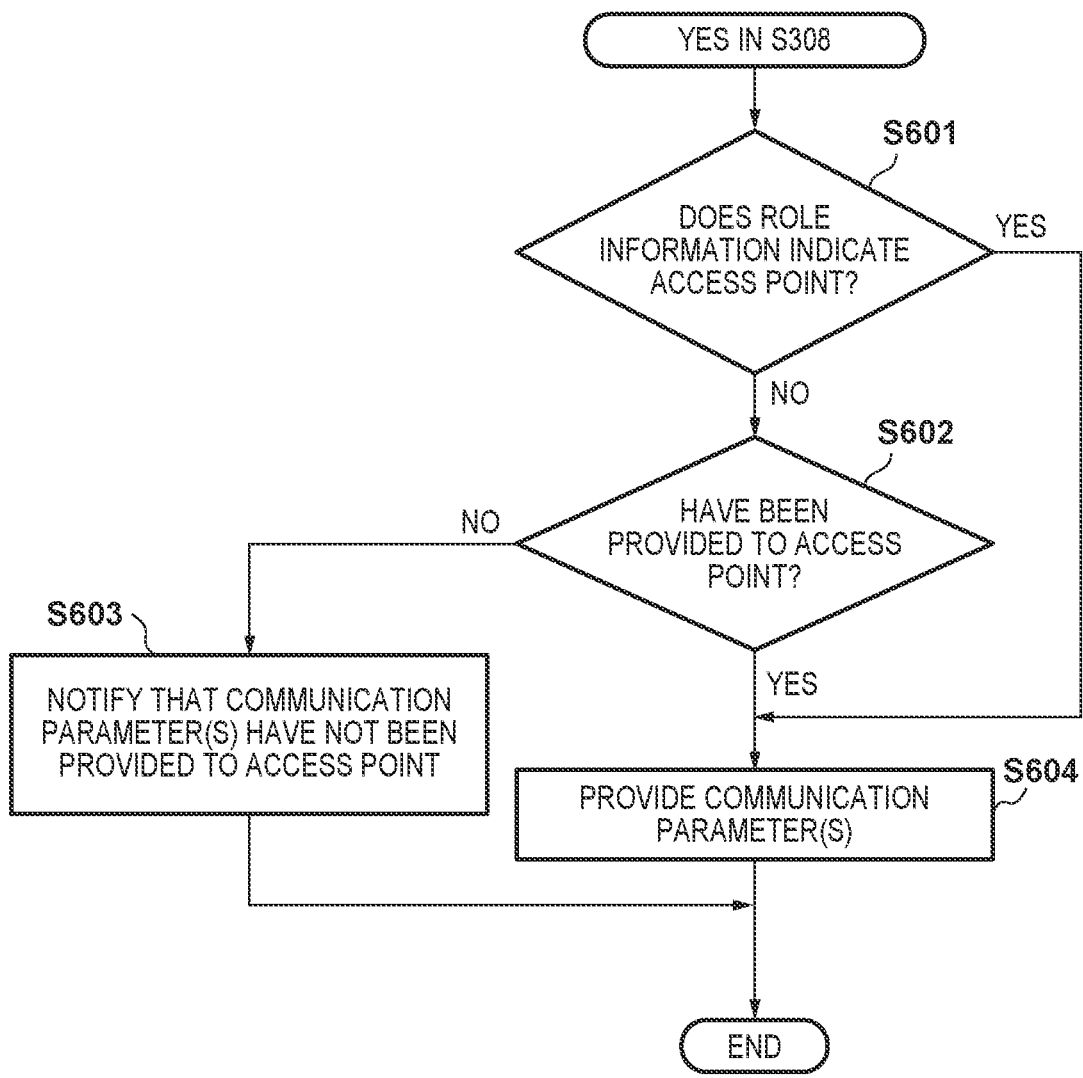
FIG. 6 is a flowchart showing other examples of operations performed by the wireless terminal 101 according to the first embodiment.

FIG. 6 is a flowchart showing processing that is performed by the wireless terminal 101 to notify the wireless terminal 102 of the fact that communication parameter(s) have not been provided to the access point 103, without performing communication parameter providing processing. The processing performed from when the configuration request is received to when whether or not communication parameter(s) have been provided to the access point 103 is determined (S601 and S602) is the same as the processing in FIG. 5 (S501 and S502).

If it is determined that communication parameter(s) have been provided to the access point 103 (YES in S602), the parameter processing unit 210 provides communication parameter(s) to the wireless terminal 102 via the transmission/reception unit 202 as a configuration response (S604). On the other hand, if it is determined that communication parameter(s) have not been provided (NO in S602), the parameter processing unit 210 notifies the wireless terminal 102 of the fact that communication parameter(s) have not been provided to the access point 103, via the transmission/reception unit 202 (S603), and terminates processing. Note that it is possible to use a configuration response, which is a response to a configuration request, to notify the wireless terminal 102 of the fact that communication parameter(s) have not been provided. For example, information called a "DPP status" include in the configuration response, defined in the DPP standards, may indicate that communication parameter(s) have not been provided.

Alternatively, a configuration response that does not include communication parameter(s) may be transmitted to the wireless terminal 102 without notifying the wireless terminal 102 of the fact that communication parameter(s) have not been provided to the access point 103 in S603. Upon receiving a configuration response, the wireless terminal 102 does not attempt to connect to a wireless network because the configuration response does not include communication parameter(s).

Figure 7:
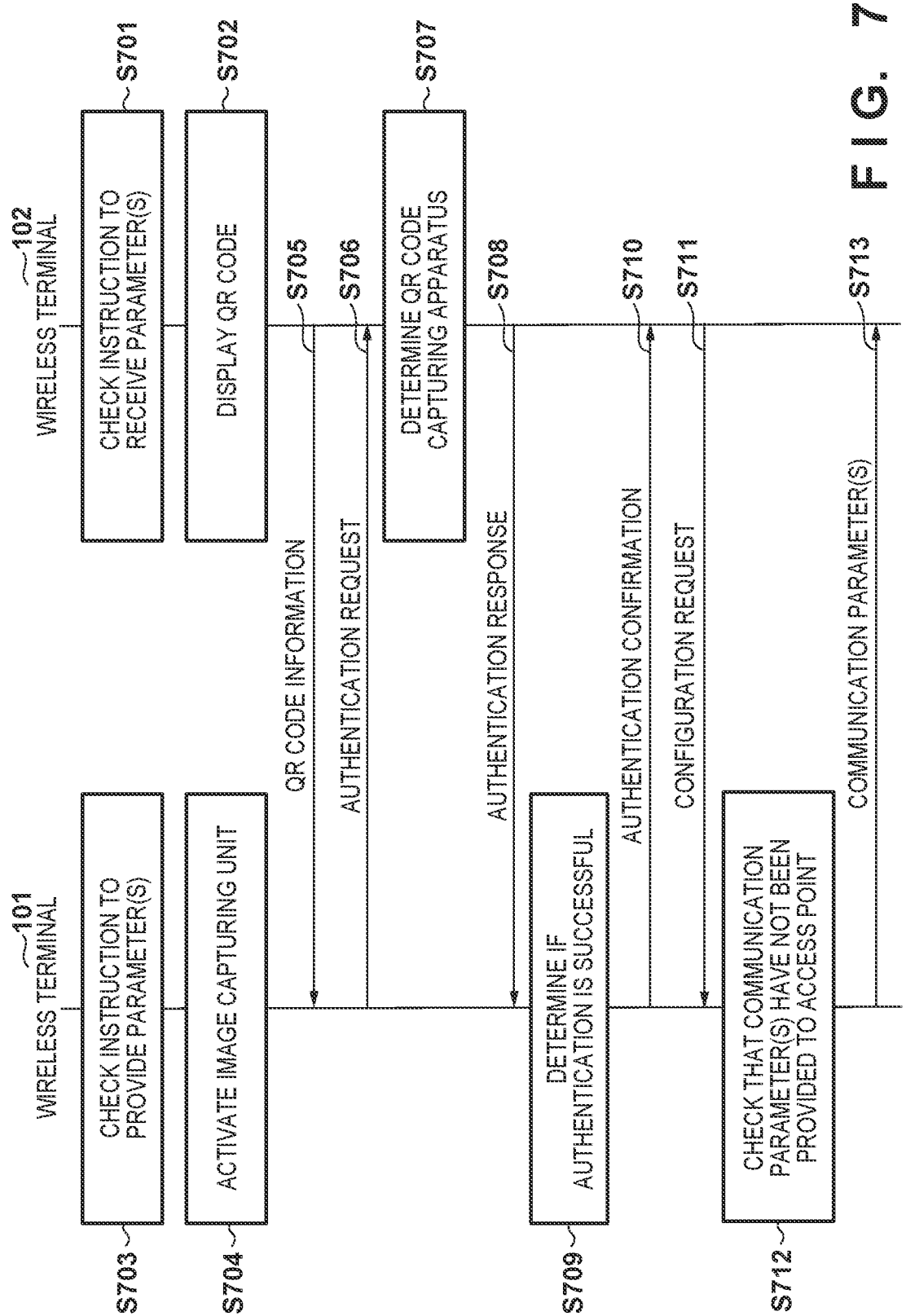
FIG. 7 is a sequence diagram showing communication parameter providing processing that is performed between the wireless terminal 101 and a wireless terminal 102 according to the first embodiment.

Next, processing that is performed between the wireless terminal 101 and the wireless terminal 102 will be described with reference to the sequence diagram shown in FIG. 7. FIG. 7 is a sequence diagram showing communication parameter providing processing that is performed between the wireless terminal 101 and the wireless terminal 102 according to the present embodiment. Upon receiving an instruction from the user to receive parameter(s) (S701), the wireless terminal 102 displays a QR code on the display unit 204 of the wireless terminal (S702). On the other hand, upon receiving an instruction from the user to provide parameter(s) (S703), the wireless terminal 101 activates the image capturing unit 207 to capture the image of the QR code displayed by the wireless terminal 102 (S704). Thereafter, upon capturing an image of the QR code displayed by the wireless terminal 102 to acquire information indicated by the QR code, the wireless terminal 101 performs authentication processing with respect to the wireless terminal 102, and waits for a configuration request which is a request for communication parameter(s) (S711). The processing in S701 to S711 is the same as the processing in S401 to S411 described with reference to FIG. 4.

Upon receiving the configuration request, the wireless terminal 101 checks role information included in the configuration request. Upon determining that the role information indicates a station, the wireless terminal 101 determines whether or not communication parameter(s) have been provided to the access point 103. Upon determining that communication parameter(s) have not been provided (S712), the wireless terminal 101 notifies the wireless terminal 102 of the fact that communication parameter(s) have not been provided to the access point 103.

As described above, according to the first embodiment, the wireless terminal 101 can notify the wireless terminal 102 of the fact that communication parameter(s) have not been provided to the access point 103, through communication parameter acquisition processing. Upon being notified of the fact that communication parameter(s) have not been provided to the access point 103, the wireless terminal 102 can recognize that the wireless network 104 does not exist, and avoid performing unnecessary connection processing.

Note that the wireless terminal 101 may check whether or not the access point 103 that constructs a connectable wireless network 104 exists before providing communication parameter(s). Specifically, in FIG. 6, before providing communication parameter(s) (S604), the wireless terminal 101 may check whether or not the access point 103 exists. For example, processing performed to check the existence of the access point 103 may be realized by performing processing to verify whether or not an SSID included in a beacon emitted from the access point 103 matches an SSID included in the communication parameter(s) to be provided. Alternatively, the wireless terminal 101 may perform processing to connect to the wireless network 104 to be constructed by the access point 103, using communication parameter(s) to be provided, and determine whether or not it can connect to the wireless network 104, to check the existence of the access point 103. Through such processing, the wireless terminal 101 can provide communication parameter(s) to the wireless terminal 102 after checking the existence of the access point 103 (the existence of the wireless network 104), and the wireless terminal 102 can avoid performing unnecessary connection processing.

Second Embodiment

The first embodiment describes a case in which the communication parameter(s) provided by the wireless terminal 101 that serves as a configurator are only communication parameter(s) for DPP. The second embodiment describes a case where the communication parameter(s) are communication parameter(s) for DPP or communication parameter(s) for non-DPP (a PSK (Pre-Shared Key) or a passphrase (hereinafter referred to as communication parameter(s) for legacy). Communication parameter(s) for legacy include an encryption key for performing authentication/key exchange based on the conventional WPA (Wi-Fi Protected Access) and IEEE 802.11. That is to say, the PSK/passphrase is information that is used to connect to the wireless network that is to be constructed by an access point according to a protocol different from DPP. Communication parameter(s) for DPP are various kinds of information that are used for the authentication protocol and the key exchange algorithm defined in DPP, and are to be used to connect to a wireless network formed by the access point according to DPP.

Figure 8:
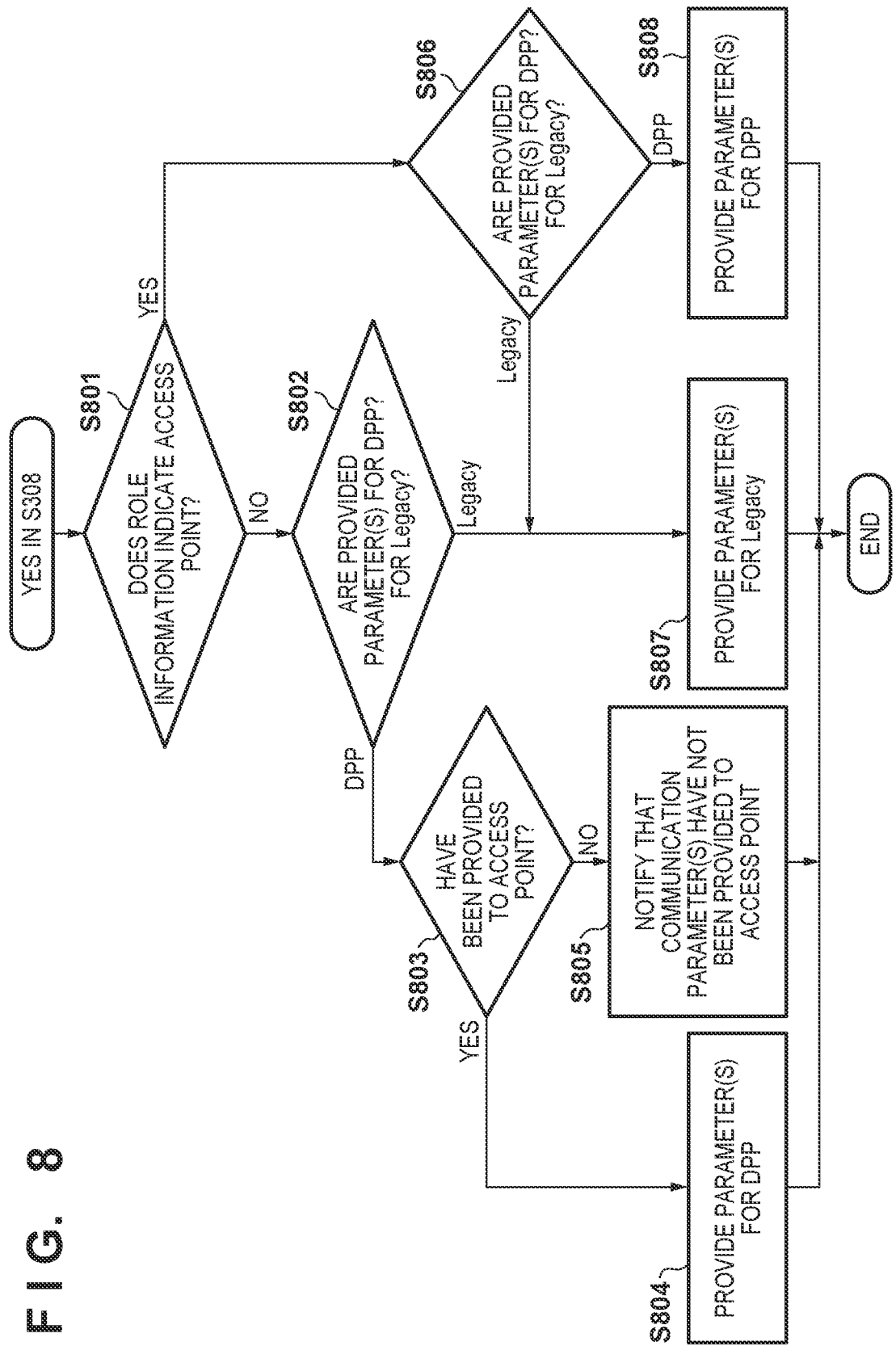
FIG. 8 is a flowchart showing examples of operations performed by a wireless terminal 101 according to a second embodiment.

FIG. 8 is a flowchart showing processing that is performed by the wireless terminal 101 to notify the wireless terminal 102 of the fact that communication parameter(s) have not been provided to the access point 103, according to the present embodiment. Processing that is performed from when the image capturing unit 207 is activated to when the configuration request is received is the same as the processing in FIG. 3 (S301 to S308). FIG. 8 shows processing that is performed after a configuration request is received (YES in S308) in FIG. 3.

The determination unit 211 of the wireless terminal 101 determines whether or not the role of the wireless terminal 102 is an access point, based on the configuration request received from the wireless terminal 102 (S801). This determination processing is performed by determining whether or not the role information included in the configuration information indicates an access point, as in S501 in FIG. 5. If it is determined that the role of the wireless terminal 102 is an access point (YES in S801), the determination unit 211 determines whether the communication parameter(s) to be provided are for DPP or for legacy (S806). If it is determined that the communication parameter(s) are for legacy (Legacy in S806), the parameter processing unit 210 provides the communication parameter(s) for legacy to the wireless terminal 102 via the transmission/reception unit 202 as a configuration response (S807). On the other hand, if it is determined that the communication parameter(s) are for DPP (DPP in S806), the parameter processing unit 210 provides the communication parameter(s) for DPP via the transmission/reception unit 202 as a configuration response (S808).

If it is determined that the role of the wireless terminal 102 is not an access point (NO in S801), the determination unit 211 determines whether the communication parameter(s) to be provided are for DPP or for legacy (S802). If it is determined that the communication parameter(s) are for legacy (Legacy in S802), the parameter processing unit 210 provides the communication parameter(s) for legacy to the wireless terminal 102 (S807). At this time, the parameter processing unit 210 provides communication parameter(s) for legacy without the determination by the determination unit 211 regarding whether or not communication parameter(s) have been provided to the access point 103, or regardless of the result of the determination regarding whether or not the communication parameter(s) have been provided. On the other hand, if it is determined that the communication parameter(s) are for DPP (DPP in S802), it is determined whether or not the communication parameter(s) have been provided to the access point 103 (S803).

If it is determined that communication parameter(s) have been provided to the access point 103 (YES in S803), the parameter processing unit 210 provides communication parameter(s) for DPP to the wireless terminal 102 via the transmission/reception unit 202 as a configuration response (S804). On the other hand, if it is determined that communication parameter(s) have not been provided (NO in S803), the parameter processing unit 210 notifies the wireless terminal 102 of the fact that communication parameter(s) have not been provided to the access point 103, via the transmission/reception unit 202 (S805). Note that the parameter processing unit 210 may provide communication parameter(s) for DPP when notifying the wireless terminal 102 of the fact that communication parameter(s) have not been provided in S805.

Figure 9:
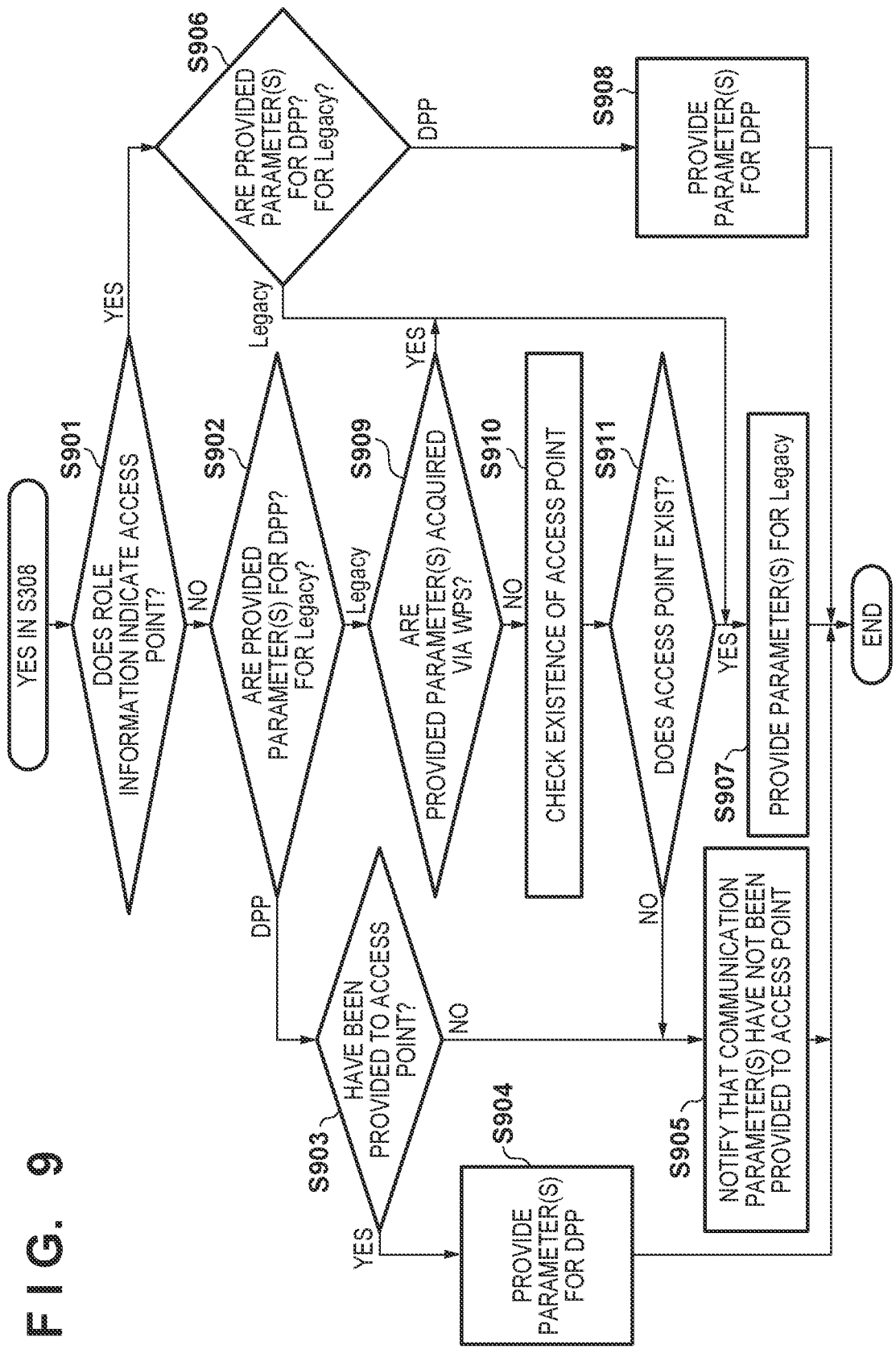
FIG. 9 is a flowchart showing other examples of operations performed by the wireless terminal 101 according to the second embodiment.

Next, FIG. 9 is a flowchart showing processing that is performed by the wireless terminal 101 to switch operations according to whether or not the communication parameter(s) for legacy to be provided have been acquired from an access point via WPS (Wi-Fi Protected Setup). If it is determined that the role of the wireless terminal 102 is an access point (YES in S901), the parameter processing unit 210 provides communication parameter(s) for legacy (S907) or communication parameter(s) for DPP (S908). If it is determined that the role of the wireless terminal 102 is not an access point (NO in S901) and parameter(s) to be provided are for DPP (DPP in S902), the parameter processing unit 210 provide communication parameter(s) for DPP (S904) or notifies the wireless terminal 102 of the fact that communication parameter(s) have not been provided (S905). This processing is the same as that in FIG. 8 (S801 to S808).

In FIG. 9, if it is determined that the role of the wireless terminal 102 is not an access point (NO in S901) and the communication parameter(s) to be provided are for legacy (Legacy in S902), processing proceeds to S909. Upon determining that the communication parameter(s) to be provided are for legacy, the wireless terminal 101, in S909, determines whether or not the communication parameter(s) to be provided have been acquired from the access point 103 via WPS. If it is determined that the communication parameter(s) have been acquired via WPS (YES in S909), the parameter processing unit 210 provides communication parameter(s) for legacy to the wireless terminal 102 via the transmission/reception unit 202 (S907). On the other hand, if it is determined that communication parameter(s) have not been acquired via WPS (NO in S909), the determination unit 211 determines whether or not the access point 103 that constructs a wireless network 104 that is connectable using communication parameter(s) for legacy exists (S910).

As a result of the determination in S910, if it is determined that the access point 103 exists (YES in S911), the parameter processing unit 210 provides communication parameter(s) for legacy to the wireless terminal 102 via the transmission/ reception unit 202 as a configuration response (S907). On the other hand, if it is determined that the access point 103 does not exist (NO in S911), the parameter processing unit 210 notifies the wireless terminal 102 of the fact that communication parameter(s) have not been provided to the access point 103, via the transmission/reception unit 202 (S905). Note that the wireless terminal 101 may notify the wireless terminal 102 of the fact that the access point 103 does not exist, instead of the fact that communication parameter(s) have not been provided.

As described above, according to the second embodiment, it is possible to notify the wireless terminal 102 of the fact that communication parameter(s) have been or have not been provided to the access point 103 even if the communication parameter(s) are not only for DPP, but for DPP or non-DPP.

In this way, according to the above-described embodiments, a configurator can notify a station of the fact that communication parameter(s) have not been provided to an access point. As a result, the station can recognize that an access point that constructs a wireless network does not exist, and it is possible to improve user convenience.

The above embodiments describe a configuration with which the image of a QR code (registered trademark) is used to exchange information for setting communication parameter(s) between apparatuses. However, instead of a QR code (registered trademark), wireless communication such as NFC or Bluetooth (registered trademark) may be used. Alternatively, wireless communication such as IEEE802.11ad or TransferJet (registered trademark) may be used. Note that a QR code (registered trademark) to be read is not limited to a QR code displayed on the display unit, and may be a QR code attached to the housing of a communication apparatus in the form of a sticker. Also, a QR code (registered trademark) to be read may be attached to an instruction manual or packaging such as cardboard at the time of sale of a communication apparatus. Also, a barcode, a two-dimensional code, or the like may be used instead of a QR code. Instead of machine-readable information such as a QR code, information in a user-readable format may be used.

Also, although the embodiments describe a case in which communication between apparatuses is performed through wireless LAN communication conforming to IEEE 802.11, the present invention is not limited in this way. For example, communication may be performed using a wireless communication medium such as wireless USB, MBOA, Bluetooth (registered trademark), UWB, ZigBee, NFC, or the like. Here, MBOA is an abbreviation for Multi Band OFDM Alliance. UWB includes wireless USB, wireless 1394, WINET, and so on.

Also, although the embodiments describe a case in which the communication parameter(s) to be used to connect to a wireless LAN access point are provided, the present invention is not limited to such a case. For example, communication parameter(s) that are to be used to connect to a group owner of Wi-Fi Direct (registered trademark) may be provided.

According to the present invention, it is possible to prevent unnecessary connection processing from being performed, and as a result, it is possible to improve user convenience.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus acts as configurator that performs communication parameter setting, the communication apparatus comprising:
   at least one memory; and
   at least one processor in communication with the at least one memory,
   wherein the at least one processor of the communication apparatus is configured to:
      perform connection processing to a network provided by an access point apparatus before transmitting a Device Provisioning Protocol (DPP) Configuration Response frame to a station apparatus which is a configuration target;
      transmit, to the station apparatus which is a transmission source of a DPP Configuration Request frame, a DPP Configuration Response frame including at least one communication parameter which should be used to connect to the access point apparatus to which the communication apparatus has successfully connected to the network by the connection processing; and
      in a situation where the communication apparatus does not have any history of sharing the at least one communication parameter for connecting the network provided by the access point apparatus with any access point apparatus in past, in a case where the communication apparatus successfully receives the DPP Configuration request frame from the station apparatus, control so as to complete processing of the communication parameter setting between the station apparatus and the communication apparatus without providing the at least one communication parameter which is used to connect to the access point apparatus to the station apparatus.

2. The communication apparatus according to claim 1, wherein,
   the DPP Configuration Response frame including the at least one communication parameter which should be used to connect to the access point apparatus is transmitted in a case where the communication apparatus receives from a station apparatus, the DPP Configuration Request frame at least includes role information indicating a station.

3. The communication apparatus according to claim 2, wherein,
   the connection processing is performed to an access point apparatus with which the communication apparatus previously communicated a DPP Configuration Request frame and a DPP Configuration Response frame, and
   in a case where the communication apparatus has failed to connect to the network as a result of the connection processing, another DPP Configuration Response which does not include the at least one communication parameter is transmitted to the station apparatus which is a transmission source of the DPP Configuration Request frame.

4. The communication apparatus according to claim 1, wherein,
   the at least one communication parameter is encrypted using a private key of the communication apparatus.

5. The communication apparatus according to claim 1, wherein,
   the at least one communication parameter includes at least one of: an SSID (Service Set Identifier); an encryption method; an encryption key; and an authentication method.

6. The communication apparatus according to claim 1, wherein,
   the at least one communication parameter includes information used by a key exchange algorithm.

* * * * *